US008583076B2

(12) United States Patent
Foladare et al.

(10) Patent No.: US 8,583,076 B2
(45) Date of Patent: *Nov. 12, 2013

(54) EMERGENCY COMMUNICATION SYSTEM AND METHOD

(75) Inventors: Mark Foladare, East Brunswick, NJ (US); Richard Bennett, Holmdel, NJ (US); Shelley Goldman, East Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/524,549

(22) Filed: Jun. 15, 2012

(65) Prior Publication Data

US 2012/0250832 A1    Oct. 4, 2012

Related U.S. Application Data

(63) Continuation of application No. 12/006,601, filed on Jan. 4, 2008, now Pat. No. 8,224,284.

(51) Int. Cl.
*H04M 11/04* (2006.01)
(52) U.S. Cl.
USPC .................................... 455/404.1; 455/404.2
(58) Field of Classification Search
USPC ........................................... 455/404.1, 404.2
See application file for complete search history.

(56) References Cited

U.S. PATENT DOCUMENTS

| | | |
|---|---|---|
| 6,002,748 A | 12/1999 | Leichner |
| 6,373,926 B1 | 4/2002 | Foladare et al. |
| 6,574,480 B1 | 6/2003 | Foladare et al. |
| 6,801,780 B1 | 10/2004 | Foladare et al. |
| 6,914,525 B2 | 7/2005 | Rao et al. |
| 7,301,450 B2 | 11/2007 | Carrino |
| 2002/0145514 A1 | 10/2002 | Dawson |
| 2003/0069002 A1 | 4/2003 | Hunter et al. |
| 2004/0103158 A1 | 5/2004 | Vella et al. |
| 2005/0030977 A1 | 2/2005 | Casey et al. |
| 2007/0038740 A1* | 2/2007 | Steeves .......................... 709/224 |
| 2007/0275690 A1* | 11/2007 | Hunter et al. ............... 455/404.2 |

* cited by examiner

*Primary Examiner* — Kamran Afshar
*Assistant Examiner* — Omoniyi Obayanju
(74) *Attorney, Agent, or Firm* — Wolff & Samson, PC

(57) ABSTRACT

A method and system for providing an emergency contact service are disclosed. The emergency contact system monitors presence off users with respect to various user devices in order to determine at which devices each user is present. An emergency message is then transmitted to devices at which the user is present. The emergency contact service is then capable of receiving a confirmation message to confirm receipt of the emergency message. The emergency contact service can track the users by retrieving location information, such as a GPS location, associated with a device at which a user is present. The emergency contact service can then identify whether a user in is the vicinity of an emergency location, and transmit an emergency message to the user is the user is in the vicinity of the emergency location.

20 Claims, 3 Drawing Sheets

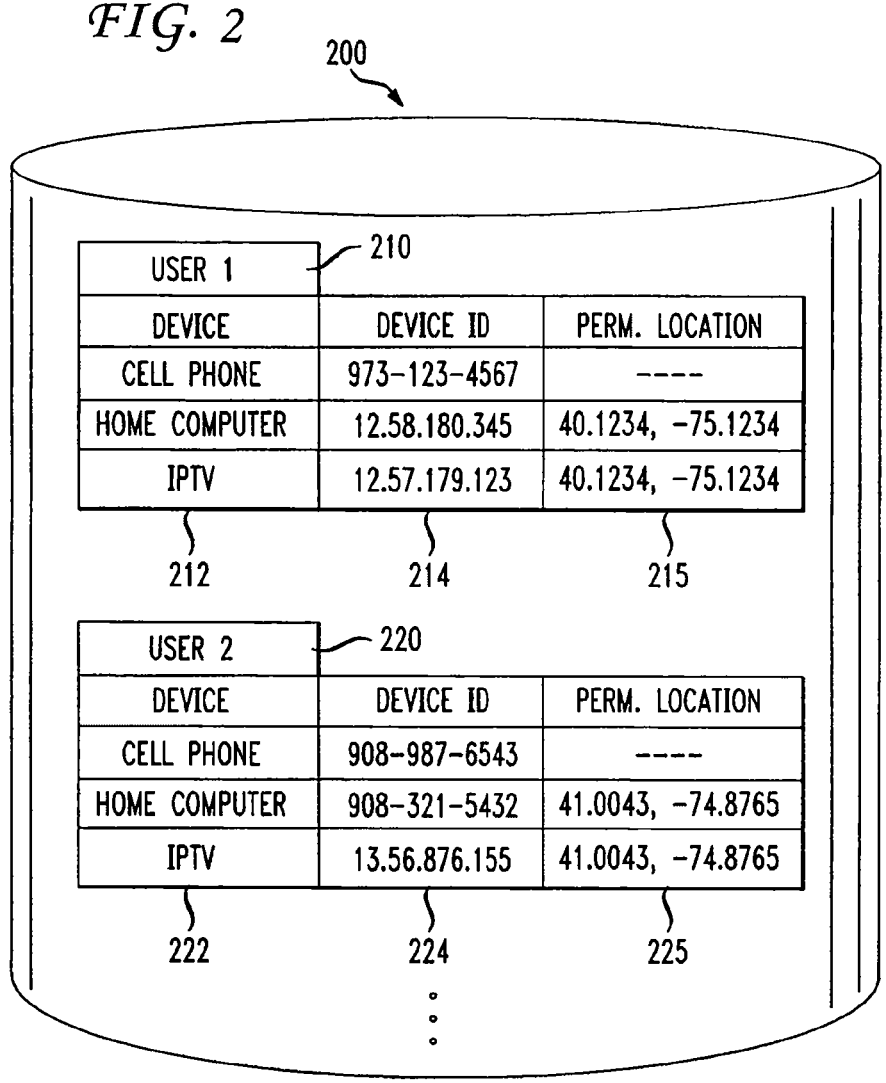

EMERGENCY COMMUNICATION SYSTEM AND METHOD

This application is a continuation of prior application Ser. No. 12/006,601 filed Jan. 4, 2008 which is incorporated herein by reference.

BACKGROUND OF THE INVENTION

The present invention is generally directed to an emergency communication system and method. More specifically, the present invention is directed to an emergency contact service that is capable of delivering emergency messages to various types of devices using various media formats.

In emergency situations, such as natural disasters, terrorist attacks, etc., it may be necessary to contact a large number of people simultaneously. For example, in such an emergency situation, it may be important to issue warnings or instructions and to determine the health and safety level of people affected by the emergency situation. Modern technology provides various user devices, such as telephones, computers, television, PDA, etc., through which it is possible to disseminate information and/or receive feedback in an emergency situation. However, since different people may be using different devices, it is difficult to effectively reach all of the people affected by an emergency situation by transmitting emergency messages to a single type of device using a single media format. Accordingly, a service which can simultaneously reach a large number of people using various types of devices is desirable.

BRIEF SUMMARY OF THE INVENTION

The present invention provides a method and system for providing an emergency contact service capable of identifying user presence at various types of user devices and delivering emergency messages to the various types of device using various media formats. The emergency contact service is also capable of tracking locations of users based on the presence of users at various devices in order to determine whether the users are affected by an emergency situation.

In one embodiment of the present invention, device information and a presence profile are stored for users that subscribed to an emergency contact service. The device information is information regarding various devices associated with each user, and the presence profile includes presence rules for determining whether the user is present at any of the devices associated with the user. In the event of an emergency situation, user presence is detected at the devices associated with each user, and an emergency message is transmitted to devices at which a user is present in a media format associated with each device. The emergency contact service can then receive confirmation messages from the devices confirming receipt of the emergency message.

In another embodiment of the present invention, when it is determined that a user is present at a device, location information for that device is retrieved. The location information can be, for example, GPS information requested from the device, location information determined based on an IP address of the device, or pre-stored location information associated with the device. The location information of the device is compared to an emergency location in order to determine whether the user is in a vicinity of the emergency location. The emergency message is transmitted to the device if the user is in the vicinity of the emergency location.

BRIEF DESCRIPTION OF THE DRAWINGS

FIG. 2 illustrates an exemplary customer database;

FIG. 3 illustrates an exemplary presence profile;

DETAILED DESCRIPTION

The present invention is directed to providing an emergency contact service. According to embodiments of the present invention, the emergency contact service is capable of providing an emergency message to various devices of users that are subscribed to the service in various media formats (e.g., text, audio, video, email, instant message, etc.) associated with the devices. The emergency contact service is capable of tracking users by detecting presence of a user at a particular device and alerting the user to an emergency situation by transmitting the emergency message to the device at which the user is present in a media format associated with the device. The emergency contact service is also capable of receiving confirmation of receipt of an emergency message from a user device.

Figure 1:
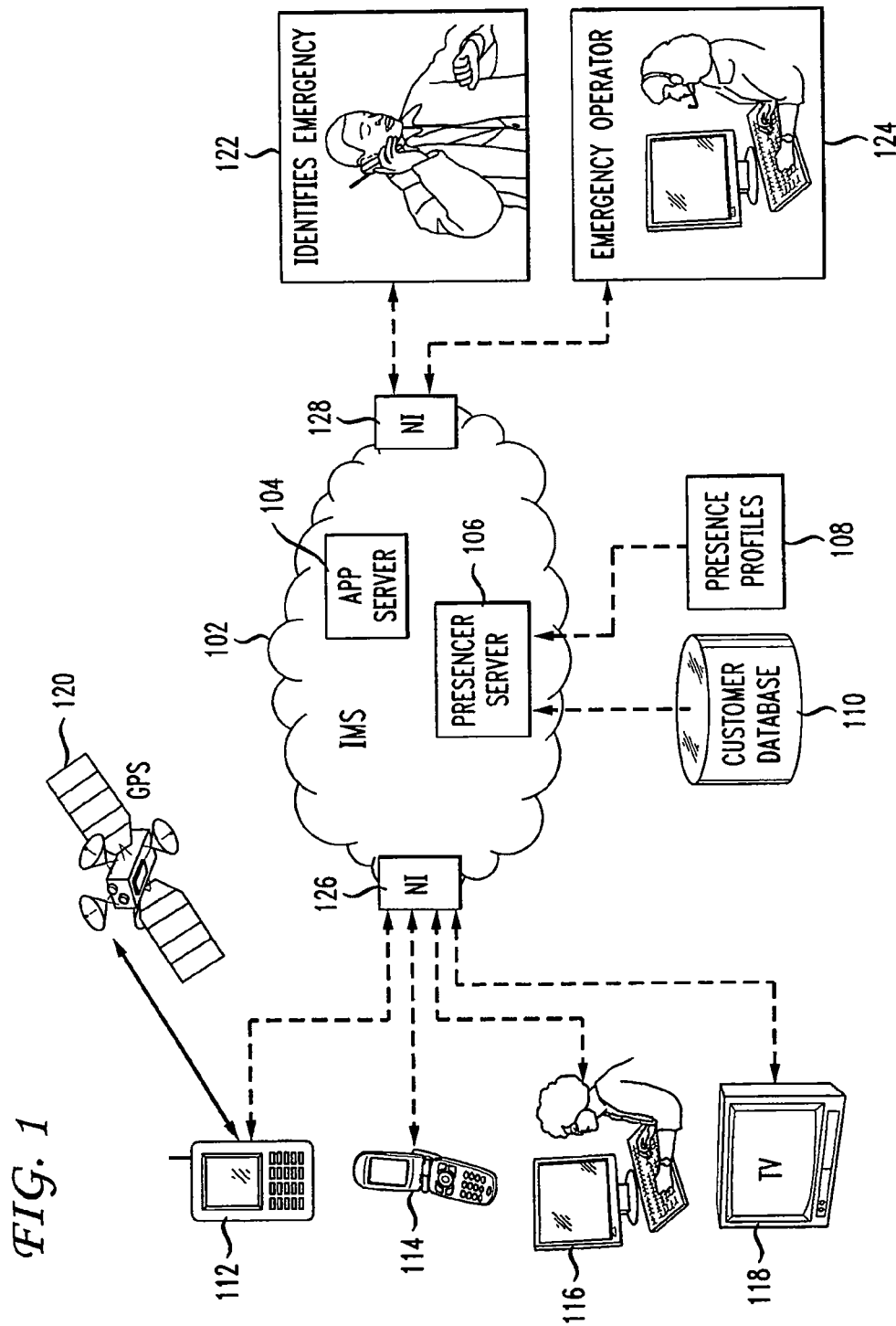
FIG. 1 illustrates an emergency contact service implemented in an IP Multimedia Subsystem (IMS) according to an embodiment of the present invention.

The emergency contact service can be implemented as part of an IP multimedia subsystem (IMS) which provides multimedia services from a service provider to registered users. FIG. 1 illustrates an emergency contact service implemented in an IMS according to an embodiment of the present invention. As illustrated in FIG. 1, an IMS 102, which is a network that provides a variety of multimedia services to subscribers (users) of the service provider, includes an application server 104 configured to implement the emergency contact service. The IMS 102 can also include multiple other application servers (not shown) configured to implement other multimedia services. The IMS 102 includes a presence server 106 which monitors presence of users at various user devices, such as PDAs 112, cellular phones 114, computers 116, internet protocol television (IPTV) clients 118, etc. The presence server 106 monitors each of the user devices by monitoring a network interface 126 at through which each device communicates with the IMS 102. The network interface 126 and the user devices can communicate via a signaling protocol, such as SIP or some other IP or packet protocol.

A customer database 110 stores records of users that are registered with the emergency contact service. FIG. 2 illustrates an exemplary customer database 200. As illustrated in FIG. 2, user profiles 210, 220 can be stored in the customer database for each registered user. Each customer profile 210, 220 stores records of devices 212, 222 associated with that user and a device ID 214, 224 for each device. The device ID for each device can be a phone number, IP address, MAC address, or some other identification for a particular device. Each customer profile 210, 220 can also store a permanent location 216, 226 for each device if that device has a permanent location. It is to be understood that the customer database 200 of FIG. 2 does not limit the present invention and can include other information as well. The customer database can be stored in storage on a computer system. For example, referring to FIG. 1, the customer database 110 can be stored on storage of the presence server 106 or storage of a computer system or in any other networked attached storage or storage area network configuration which can communicate with the presence server 106. In addition to other customer identifying information that may be needed to operate the service (e.g. Name, address billing info), the customer database 110 contains a list of identifying endpoints that each user may own. An identifying endpoint may be a hard endpoint such as a Fixed IP address or MAC address that the network registers when turned on. An identifying endpoint may also be a soft endpoint, one that is registered using a VPN client or other software, either PC or browser based, that is registered using an identifying ID or password. In this case, the ID and password that can be stored within the customer database 110.

As illustrated in FIG. 1, presence profiles 108 are maintained for the users. A presence profile 108 for each user can include presence information regarding each of the devices associated with a user. FIG. 3 illustrates an exemplary presence profile for a user. As illustrated in FIG. 3, for each device ID 302, the presence profile stores a presence indicator 304 that indicates whether the user is present at the corresponding device. The presence profile may also include location information 306 corresponding to a current location of each device. The presence profile can be stored in memory of a computer system and updated by the presence server 106 in real time in response to change in the user presence at various devices. The presence profiles 108 can also include other information as such as presence rules for determining whether a user is present each of the devices associated with that user. The presence profiles 108 and the customer database 110 can be stored at the same computer system or separately. The presence profile also obtains hard location data (e.g. IP address, physical location, MAC address) from any device registered as a soft endpoint and logged in through an ID and password.

An emergency call can be sent to the IMS 102, for example by an emergency worker 122 or an emergency operator 124, and received at the IMS through a network interface 128. The emergency call can be in various media formats, such as a phone call, text message, email, etc. When the IMS 102 receives the emergency call, an emergency message corresponding to the emergency call is generated and the IMS 102 calls the application server 104 configured to implement the emergency contact service. The emergency message can be generated in various media formats automatically based on information in the emergency call or generated by the emergency operator 124 or other personnel. For each user registered with the emergency contact service (and identified in the customer database 110), the presence server 106 determines whether that user is present at the devices associated with that user. The application server 104 transmits the emergency message to the user device at which each user is present. The application server 104 transmits the emergency message in a media format associated with the device to which the message is sent. For example, the application server 104 can transmit messages as text messages, voice messages, instant messages, emails, video messages, etc., depending on the device at which the user is present. It is possible that specified preferences for each device can be stored for each user in the customer database 110 or presence profile 108.

When the emergency message is sent to one or more devices of each user, it is possible that the emergency message requests a confirmation to confirm that the user has received the message. The user can send a confirmation message back to the IMS 102 from the device that received the message. For example, the user may press a designated button on a keypad, keyboard, or IPTV remote control, or speak a designated word or phrase to confirm receipt of the emergency message. The confirmation message can then be routed through the IMS 102 network and transmitted to the emergency operator 124. It is also possible that the confirmation messages be automatically monitored, and the IMS 102 continue to monitor presences of users and re-transmit emergency messages to a user until a confirmation message is received from that user. The confirmation message can be stored in the customer database 110 or the presence profile 108 associated with the user.

Various portable devices, such as PDAs 112, cellular phones 114, laptop computers, automobile computer systems, etc., can be equipped with global positioning system (GPS) technology 120 in order to track a position of the devices. The emergency contact service can take location information, such as GPS information, associated with each device into account when transmitting emergency messages. For example, some user devices, such as desktop computers 116 and televisions 118 may have associated location information stored in the customer database 110, while other user devices, such as PDAs 112, a cellular phones 114, and laptop computers, may be able to generate location information using GPS technology 120. When an emergency call is received at the IMS 102, the emergency call includes emergency location information. When the presence server 106 determines the devices at which each user is currently present, location information associated with the devices is retrieved, either from stored location information in the presence profile or by requesting GPS location information from the device itself. Based on the location information of each device, it can be determined by the presence server 106 whether the user is within a certain range of the emergency location. Thus, the emergency contact service can track the users based on the presence and location information, and identify which users are in the vicinity of the emergency location. It is possible for the emergency contact service to only contact users in the vicinity of the emergency location based on the presence information and the location information.

Figure 4:
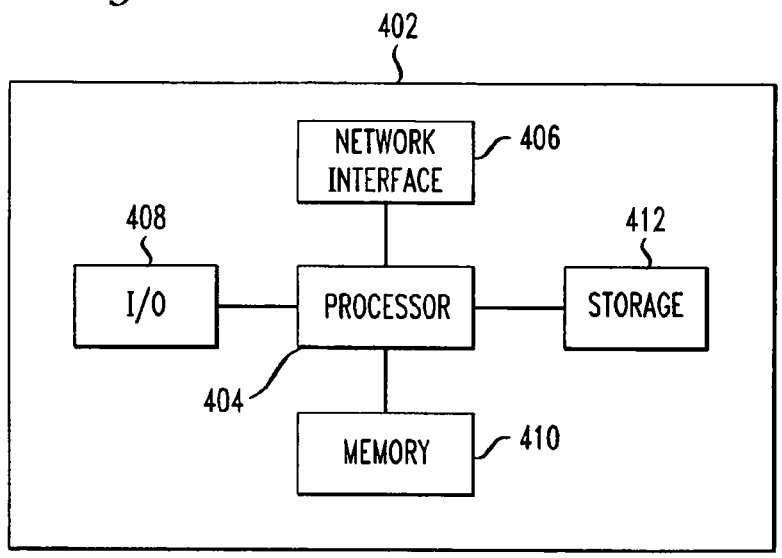
FIG. 4 illustrates a high level block diagram of a computer capable of implementing the present invention.

IMS components, such as application servers, presence servers, and database, as well as user devices may be implemented on one or more computers using well known computer processors, memory units, storage devices, computer software, and other components. A high level block diagram of such a computer is shown in FIG. 4. Computer 402 contains a processor 404 which controls the overall operation of the computer 402 by executing computer program instructions which define such operation. The computer program instructions may be stored in a storage device 412 (e.g., magnetic disk) and loaded into memory 410 when execution of the computer program instructions is desired. Thus, the method steps of FIG. 5 described herein can be defined by the computer program instructions stored in the memory 410 and/or storage 412 and the buddy list function will be controlled by the processor 404 executing the computer program instructions. The computer 402 also includes one or more network interfaces 406 for communicating with other devices via a network. The computer 402 also includes input/output 408 which represents devices which allow for user interaction with the computer 402 (e.g., display, keyboard, mouse, speakers, buttons, etc.). One skilled in the art will recognize that an implementation of an actual computer will contain other components as well, and that FIG. 4 is a high level representation of some of the components of such a computer for illustrative purposes.

In order to implement an emergency contact service, users are registered to the emergency contact service. Users may register as part of an IMS service that offers a variety of multimedia services. Users may also be automatically registered to the emergency contact service as part of phone, internet, and/or cable television service. It is also possible that users subscribe to the emergency contact service as a stand-alone service.

When a user is registered to the emergency contact service, information regarding user devices of the user is stored in the customer database 110. The device information for each user can specify multiple devices associated with the user, such as a PDA, cellular telephone, television, desktop computer, laptop computer, etc. The device information can also include device preferences for each of the devices. The device preferences can specify the user's preferred media format to receive messages on a particular device. For example, a user may select from voice or text message on a cellular phone, instant message, email, or streaming video on a computer, and video or scrolling text on a television. Other user preferences included in the device information may specify whether to transmit to multiple devices when a user is present at more than one device or follow a user specified device priority to transmit to a single user device at which the user is present. It is to be understood that the above described examples do not limit the present invention, and other device preferences may be specified by a user and stored in the customer database.

A presence profile 108 is also maintained for each user and continuously updated. The presence profile 108 can include an indication of user presence as well as presence rules for each device associated with the user. The presence rules can be used to determine whether a user is present at a particular device. For example, a user may be considered present at a device, such as a cell phone or a television, whenever the device is on. For other devices, such as a computer, the user may need to be connected to a network to be considered present. It is possible that a personal identifier associated with the user be used in a cell phone or IPTV remote control to detect presence at the cell phone or television or both. The presence profile 108 is used by a presence server to continuously monitor the users presence at various devices associated with the user.

Figure 5:
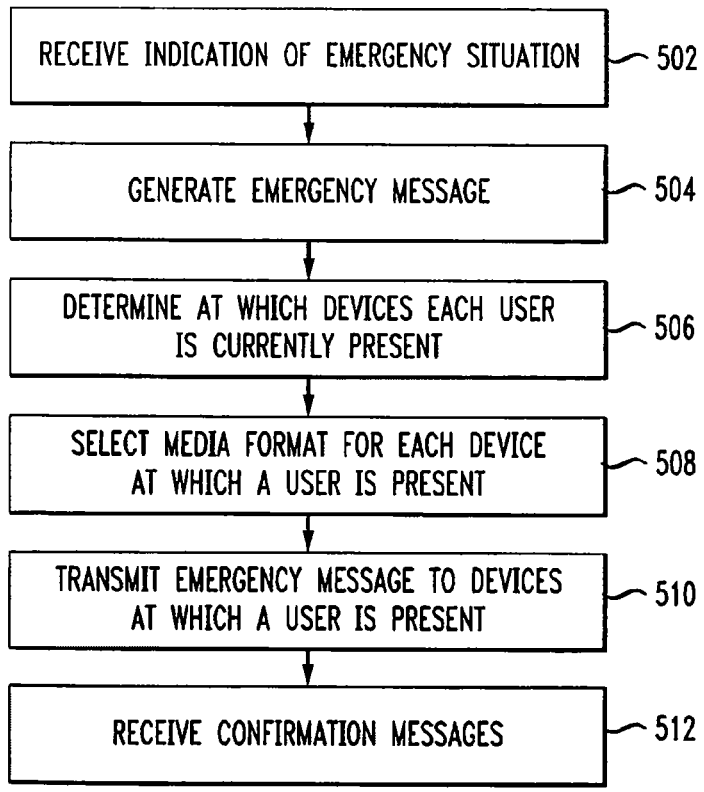
FIG. 5 illustrates a method of emergency communication according to an embodiment of the present invention.

When users are registered to the emergency contact service, the users can receive emergency communication via the service in emergency situations. FIG. 5 illustrates a method of emergency communication according to an embodiment of the present invention. At step 502, an indication of an emergency situation is received. The emergency call can be received in any media format through a network interface 128. For example, an emergency call from an emergency worker 122 can be received, or instructions indicating that an emergency message is necessary can be received from an emergency operator 124. An emergency situation can be any situation that requires simultaneously contacting a large number of people. For example, emergency situations can include natural disasters, terrorist attacks, etc.

At step 504, an emergency message is generated based on the emergency call. The emergency message can be generated in various media formats corresponding to various types of user devices. The emergency message can be automatically generated based on information in the emergency call or generated manually by the emergency operator 124 or other personnel.

At step 506, the presence server 106 determines for each user at which devices that user is currently present. The presence server 106 determines, based on the presence profile 108, whether the user is currently present at each of the devices associated with the user. It is possible that the user is not present at any devices, and it is also possible that the user is present at multiple devices. If the user is not present at any device, the presence server 106 continues to monitor the presence of the user, until the user becomes present at a device. If the user is present at multiple devices, an emergency message will be sent to at least one of the devices at which the user is present. It is possible to send the emergency message to all of the devices at which a user is present. Whether to transmit the emergency message to all devices at which a user is present or one device at which a user is present can be a system wide setting or can be specified in the device information stored in the customer database 110 for each user. For example, a user can specify a priority for which device to choose if the user is present at multiple devices.

At step 508, a media format is selected for the at least one device at which the user is present, for each user. As described above the media format associated with a device may be specified in the device information stored in the customer database. It is also possible that a default media format associated with each type of device be used. Media formats for transmitting to various devices can include, but are not limited to, text message, voice message, video message, email, instant message, etc.

At step 510, an emergency message is transmitted to the at least one device at which the user is present, for each user. The emergency message for each device is transmitted in the media format associated with that device.

At step 512, confirmation messages are received from users confirming receipt of the emergency message. The confirmation messages can be received in response to a request for confirmation included in the emergency message transmitted to each device. It is possible that a device confirmation and a user confirmation be requested for each device. The device confirmation confirms receipt of the transmitted emergency message by the device. The user confirmation confirms that the user has received (read, viewed, heard, etc.) the emergency message. The user confirmation message can be in various formats, such as text, voice, etc. If either of the confirmation messages are not received from a device within a certain time, the emergency message can be re-sent to the device. A user may actually visually receive the alert on one device, use another device to confirm receipt, and be able to view the confirmation on any one or more of the devices. For example, the user may receive or see the emergency alert over an IPTV device and use a cell phone as the interface to send back a confirmation receipt, viewing its acknowledgement on the TV set. The user may also be able to view the whether other members of their immediate circle (e.g. family) has confirmed receipt of the confirmation.

As described in FIG. 5 at steps 506-510, presence is detected for each user with respect to devices associated with the user, and an emergency message is transmitted to at least one of the devices associated with a user at which the user is present. According to another embodiment of the present invention, it is possible that for some emergency messages, the emergency contact service can target a particular type of device. In this case the emergency contact service waits for presence to be detected at a particular type of device for a user before transmitting the message to that user at the particular type of device. In this case, the message is sent out in a single media format, and the emergency contact service uses the presence information to determine when to transmit the message to each user.

According to another embodiment of the present invention, the emergency contact service can track users to identify which users are in the vicinity of an emergency situation, and transmit emergency messages only to those users in the vicinity of the emergency situation. In this case, when the presence of each user is detected at a device (step 506 of FIG. 5), location information is retrieved for that device. For devices equipped with a GPS receiver, the location information can be requested from the device itself. It is also possible to retrieve an IP address of a device and determine a location based on the IP address. Furthermore, for a device, such as a desktop computer or a television, whose location does not often change, location information associated with the device can be stored, for example in the customer database. Once the location information for a device is retrieved, the location information is compared with the emergency location information to determine whether the device (and the user who is present at the device) is within a specified distance of the emergency location. If a device is in the specified distance of the emergency location, the device (and user) is determined to be in the vicinity of the emergency situation. The emergency service then transmits the emergency message only to those devices determined to be in the vicinity of the emergency location.

According to another embodiment of the present invention, the emergency contact service can track users to identify which users are in the vicinity of an emergency situation and belong to a specific subset or group (e.g. firefighters and emergency rescue workers). The particular subset may receive one particular message such as to deploy or begin operations while other groups are either not notified (if no action is required) or provided separate instructions, such as to evacuate.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An emergency communication method comprising:
receiving an indication of an emergency situation;
detecting, for each of a plurality of users, a device at which that user is present;
retrieving location information for the device at which each of the plurality of users is present;
determining which of the plurality of users are in a vicinity of the emergency situation based on the location information;
determining for each user determined to be in the vicinity of the emergency situation whether that user is within a specific subset of users;
for each of the plurality of users determined to be in the vicinity of the emergency situation and determined to be within the specific subset of users, transmitting a first emergency message to the device at which that user is present in a media format associated with the device, wherein the first emergency message comprises a request for two separate confirmation messages, including:
a first confirmation message that is a device confirmation message; and
a second confirmation message that is a user confirmation message, wherein the first confirmation message is separate from the second confirmation message;
in response to determining that one of the first confirmation message and the second confirmation message is not received within a predetermined period of time for one of the users determined to be in the vicinity of the emergency situation and determined to be within the specific subset of users, re-sending the first emergency message to the device at which that user is present;
for each of the plurality of users determined to be in the vicinity of the emergency situation and determined not to be within the specific subset of users, transmitting a second emergency message, different from the first emergency message, to the device at which that user is present in a media format associated with the device, wherein the second emergency message comprises a request for two separate confirmation messages, including:
a third confirmation message that is a device confirmation message; and
a fourth confirmation message that is a user confirmation message, and the first confirmation message is separate from the second confirmation message; and
in response to determining that one of the third confirmation message and the fourth confirmation message is not received within a predetermined period of time for one of the users determined to be in the vicinity of the emergency situation and determined to be within the specific subset of users, re-sending the second emergency message to the device at which that user is present.

2. The method of claim 1, further comprising:
storing device information regarding multiple devices associated with each of the plurality of users; and
storing a presence profile associated with each of the plurality of users, the presence profile for each user including presence rules for determining presence of the user at each of the multiple devices associated with the user.

3. The method of claim 2, further comprising:
selecting the media format associated with the device at which each of the users determined to be in the vicinity of the emergency situation is present based on the device information for the device.

4. The method of claim 2, wherein the detecting, for each of a plurality of users, a device at which that user is present comprises:
continuously monitoring the user presence at the multiple devices associated with each of the plurality of users based on the presence profile.

5. The method of claim 1, wherein the determining which of the plurality of users are in a vicinity of the emergency situation based on the location information comprises:
comparing the location information for the device at which each of the plurality of users is present with an emergency location.

6. The method of claim 1, wherein the retrieving location information for the device at which each of the plurality of users is present comprises one of:
requesting GPS location information from the device;
determining location information based on an IP address of the device; and
retrieving stored location information associated with the device.

7. The method of claim 1, wherein the specific subset of users corresponds to emergency rescue workers.

8. The method of claim 7, wherein the first emergency message is a message to deploy or begin operations, and the second emergency message is a message to evacuate.

9. An emergency communication apparatus comprising:
a memory storing computer program instructions; and
a processor communicatively coupled to the memory, the processor configured to execute the computer program instructions, which, when executed on the processor, cause the processor to perform a method comprising:

receiving an indication of an emergency situation;

detecting, for each of a plurality of users, a device at which that user is present;

retrieving location information for the device at which each of the plurality of users is present;

determining which of the plurality of users are in a vicinity of the emergency situation based on the location information;

determining for each user determined to be in the vicinity of the emergency situation whether that user is within a specific subset of users;

for each of the plurality of users determined to be in the vicinity of the emergency situation and determined to be within the specific subset of users, transmitting a first emergency message to the device at which that user is present in a media format associated with the device, wherein the first emergency message comprises a request for two separate confirmation messages, including:

a first confirmation message that is a device confirmation message; and a second confirmation message that is a user confirmation message, wherein the first confirmation message is separate from the second confirmation message;

in response to determining that one of the first confirmation message and the second confirmation message is not received within a predetermined period of time for one of the users determined to be in the vicinity of the emergency situation and determined to be within the specific subset of users, re-sending the first emergency message to the device at which that user is present;

for each of the plurality of users determined to be in the vicinity of the emergency situation and determined not to be within the specific subset of users, transmitting a second emergency message, different from the first emergency message, to the device at which that user is present in a media format associated with the device, wherein the second emergency message comprises a request for two separate confirmation messages, including:

a third confirmation message that is a device confirmation message; and a fourth confirmation message that is a user confirmation message, and the first confirmation message is separate from the second confirmation message; and in response to determining that one of the third confirmation message and the fourth confirmation message is not received within a predetermined period of time for one of the users determined to be in the vicinity of the emergency situation and determined to be within the specific subset of users, re-sending the second emergency message to the device at which that user is present.

10. The apparatus of claim 9, wherein the detecting, for each of a plurality of users, a device at which that user is present comprises:

continuously monitoring user presence at multiple devices associated with each of the plurality of users based on a respective presence profile stored for each of the plurality of users including presence rules for determining presence of the user at each of the multiple devices associated with the user.

11. The apparatus claim 9, wherein the determining which of the plurality of users are in a vicinity of the emergency situation based on the location information comprises:

comparing the location information for the device at which each of the plurality of users is present with an emergency location.

12. The apparatus of claim 9, wherein the retrieving location information for the device at which each of the plurality of users is present comprises one of:

requesting GPS location information from the device;

determining location information based on an IP address of the device; and retrieving stored location information associated with the device.

13. The apparatus of claim 9, wherein the specific subset of users corresponds to emergency rescue workers.

14. The apparatus of claim 13, wherein the first emergency message is a message to deploy or begin operations, and the second emergency message is a message to evacuate.

15. A non-transitory computer readable medium storing computer program instructions, which when executed on a processor, cause the processor to perform a method comprising:

receiving an indication of an emergency situation;

detecting, for each of a plurality of users, a device at which that user is present;

retrieving location information for the device at which each of the plurality of users is present;

determining which of the plurality of users are in a vicinity of the emergency situation based on the location information; and determining for each user determined to be in the vicinity of the emergency situation whether that user is within a specific subset of users;

for each of the plurality of users determined to be in the vicinity of the emergency situation and determined to be within the specific subset of users, transmitting a first emergency message to the device at which that user is present in a media format associated with the device, wherein the first emergency message comprises a request for two separate confirmation messages, including:

a first confirmation message that is a device confirmation message; and a second confirmation message that is a user confirmation message, wherein the first confirmation message is separate from the second confirmation message; and in response to determining that one of the first confirmation message and the second confirmation message is not received within a predetermined period of time for one of the users determined to be in the vicinity of the emergency situation and determined to be within the specific subset of users, re-sending the first emergency message to the device at which that user is present;

for each of the plurality of users determined to be in the vicinity of the emergency situation and determined not to be within the specific subset of users, transmitting a second emergency message, different from the first emergency message, to the device at which that user is present in a media format associated with the device, wherein the second emergency message comprises a request for two separate confirmation messages, including:

a third confirmation message that is a device confirmation message; and a fourth confirmation message that is a user confirmation message, and the first confirmation message is separate from the second confirmation message; and in response to determining that one of the third confirmation message and the fourth confirmation message is not received within a predetermined period of time for one of the users determined to be in the vicinity of the emergency situation and determined to be within the specific subset of users, re-sending the first emergency message to the device at which that user is present.

16. The non-transitory computer readable medium of claim 15, wherein the detecting, for each of a plurality of users, a device at which that user is present comprises:

continuously monitoring user presence at multiple devices associated with each of the plurality of users based on a respective presence profile stored for each of the plurality of users including presence rules for determining presence of the user at each of the multiple devices associated with the user.

17. The non-transitory computer readable medium of claim 15, wherein the determining which of the plurality of users are in a vicinity of the emergency situation based on the location information comprises:

comparing the location information for the device at which each of the plurality of users is present with an emergency location.

18. The non-transitory computer readable medium of claim 15, wherein the retrieving location information for the device at which each of the plurality of users is present comprises one of:

requesting GPS location information from the device;

determining location information based on an IP address of the device; and retrieving stored location information associated with the device.

19. The non-transitory computer readable medium of claim 15, wherein the specific subset of users corresponds to emergency rescue workers.

20. The non-transitory computer readable medium of claim 19, wherein the first emergency message is a message to deploy or begin operations, and the second emergency message is a message to evacuate.

* * * * *